(12) United States Patent
Whittenberger et al.

(10) Patent No.: US 8,112,481 B2
(45) Date of Patent: Feb. 7, 2012

(54) DOCUMENT MESSAGE STATE MANAGEMENT ENGINE

(75) Inventors: Kevin Whittenberger, Woodinville, WA (US); Sonja Jackson, Bellevue, WA (US); Jason Ladwig, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 2588 days.

(21) Appl. No.: 10/402,337

(22) Filed: Mar. 28, 2003

(65) Prior Publication Data

US 2004/0205136 A1 Oct. 14, 2004

(51) Int. Cl.
G06F 15/16 (2006.01)

(52) U.S. Cl. ............ 709/206; 709/207; 395/200.62; 345/536; 345/537; 345/538; 715/205; 715/221

(58) Field of Classification Search .......... 709/206–207; 715/205, 221; 345/536–538
See application file for complete search history.

(56) References Cited

U.S. PATENT DOCUMENTS

| | | | | |
|---|---|---|---|---|
| 5,436,619 A * | 7/1995 | Yun | | 340/7.52 |
| 5,719,942 A * | 2/1998 | Aldred et al. | | 709/228 |
| 5,905,863 A * | 5/1999 | Knowles et al. | | 709/206 |
| 5,960,178 A * | 9/1999 | Cochinwala et al. | | 709/232 |
| 6,073,142 A * | 6/2000 | Geiger et al. | | 715/500 |
| 6,154,764 A * | 11/2000 | Nitta et al. | | 709/200 |
| 6,226,630 B1 * | 5/2001 | Billmers | | 707/3 |
| 6,275,850 B1 * | 8/2001 | Beyda et al. | | 709/206 |
| 6,347,340 B1 * | 2/2002 | Coelho et al. | | 709/246 |
| 6,377,543 B1 * | 4/2002 | Grover et al. | | 370/227 |
| 6,411,947 B1 * | 6/2002 | Rice et al. | | 706/47 |
| 6,505,237 B2 * | 1/2003 | Beyda et al. | | 709/206 |
| 6,732,185 B1 * | 5/2004 | Reistad | | 709/238 |
| 6,778,941 B1 * | 8/2004 | Worrell et al. | | 702/176 |
| 6,792,085 B1 * | 9/2004 | Rigaldies et al. | | 379/88.13 |
| 7,096,226 B2 | 8/2006 | Brock et al. | | |
| 7,287,249 B2 | 10/2007 | Coyle et al. | | |
| 7,317,697 B2 * | 1/2008 | Lewis et al. | | 370/312 |
| 7,596,101 B2 * | 9/2009 | Oguchi | | 370/256 |
| 7,614,057 B2 | 11/2009 | Whittenberger | | |
| 2002/0038228 A1 | 3/2002 | Waldorf et al. | | |

(Continued)

FOREIGN PATENT DOCUMENTS

WO WO 00/29924 5/2000

(Continued)

OTHER PUBLICATIONS

Yang et al., J., "Interoperation Support for Electronic Business", Communications of the Association for Computing Machinery, vol. 42, No. 6, pp. 39-47, Jun. 2000.

(Continued)

*Primary Examiner* — John Follansbee
*Assistant Examiner* — Saket K Daftuar
(74) *Attorney, Agent, or Firm* — Westman Champlin & Kelly

(57) ABSTRACT

A state management sub-system that assists in transmitting and processing documents and messages between two applications in a sequentially correct order through an integration server is disclosed. The state management subsystem analyzes the message and enters state information about the message into a state management table. Once the message is transformed the state management subsystem check the status of the message in the state management table, and checks all waiting parameters. Depending on the status of the check, the state management subsystem changes the state of message in the table. Only when all messages have passed the waiting parameters check is a message posted to the destination system.

18 Claims, 9 Drawing Sheets

U.S. PATENT DOCUMENTS

| | | | | |
|---|---|---|---|---|
| 2002/0059432 | A1* | 5/2002 | Masuda et al. | 709/227 |
| 2003/0018808 | A1* | 1/2003 | Brouk et al. | 709/238 |
| 2003/0041178 | A1* | 2/2003 | Brouk et al. | 709/313 |
| 2003/0053459 | A1* | 3/2003 | Brouk et al. | 370/392 |
| 2003/0109248 | A1* | 6/2003 | Lewis | 455/412 |
| 2003/0126301 | A1* | 7/2003 | Mason et al. | 709/310 |
| 2003/0142680 | A1* | 7/2003 | Oguchi | 370/400 |
| 2003/0153302 | A1* | 8/2003 | Lewis et al. | 455/412 |
| 2003/0179742 | A1* | 9/2003 | Ogier et al. | 370/351 |
| 2003/0187996 | A1* | 10/2003 | Cardina et al. | 709/228 |
| 2003/0233347 | A1* | 12/2003 | Weinberg et al. | 707/3 |
| 2004/0024740 | A1 | 2/2004 | McGeorge | |
| 2004/0078355 | A1* | 4/2004 | Suresh | 707/1 |
| 2004/0087300 | A1* | 5/2004 | Lewis | 455/412.2 |
| 2006/0112165 | A9* | 5/2006 | Tomkow et al. | 709/206 |
| 2006/0126101 | A1* | 6/2006 | Shutt et al. | 358/1.15 |

FOREIGN PATENT DOCUMENTS

| | | |
|---|---|---|
| WO | WO 02/25893 A2 | 3/2002 |
| WO | WO 02/39353 | 5/2002 |

OTHER PUBLICATIONS

Linthicum, D. S., "Defining B2B Application Integration", E-Business-Enable Your Enterprise, pp. 4-9 and 26-30, Aug. 2001.

Olsen, Greg, "The Rise of Partner Relationship Management", eAI Journal, Oct. 2000.

Schulte, Roy, "Real-World Lessons for Systematic Application Integration", Gartner Research AV-15-5519, Mar. 1, 2002.

Vasters, Clemens F., "BizTalk™ Server 2000: A Beginner's Guide", Network Professional's Library, The McGraw-Hill Companies, Inc. 2001.

Prosecution of U.S. Appl. No. 10/435,629: Response to Restriction filed Jul. 27, 2006; Amendment filed Dec. 7, 2007; Amendment filed Aug. 4, 2008; Amendment filed Oct. 15, 2008, Amendment filed Apr. 21, 2009.

R. Clarke, D. Filippidou, P. karasis, P. Loucopoulos, R. Scott "Integrating the Management of Discovered and Developed Knowledge," In Proceedings of Panhellenic Conference on New Information Technology, NIT '98, Athens, Greece, Oct. 1998.

Kardasis et al., P., "Aligning Legacy Information Systems to Business Processes," Proceedings of the 10th Conference on Advantage Information Systems Engineering, CaiSE '98, Pisa, Italy, 812, Jun. 1998.

Vasters, Clemens F., "BizTalk" Server 2000: A Beginner's Guide, Network Professional's Library, The McGraw-Hill Companies, Inc. 2000. 680 pages.

Restriction Requirement dated Jul. 3, 2006, U.S. Appl. No. 10/435,629, filed May 9, 2003. 6 pgs.

Official Action dated Sep. 7, 2007, U.S. Appl. No. 10/435,629, filed May 9, 2003. 9 pgs.

Official Action dated Mar. 21, 2008, U.S. Appl. No. 10/435,629, filed May 9, 2003. 16 pgs.

Official Action dated Jan. 21, 2009, U.S. Appl. No. 10/435,629, filed May 9, 2003. 14 pgs.

Partial European Search Report, European Appln. No. 04 007 249.8, dated Jun. 18, 2009.

Linthicum, David S. "Enterprise Application Integration," May 2000, Addison-Wesley, XP002527698, ISBN: 0-201-61583-5, selected pp. 18-21 of Chapter 1, (Edfining EAI); selected pp. 23-36 of Chapter 2 (Data-Level EAI); selected pp. 163-176 of Chapter 9 (RPCs, Messaging, and EAI), selected pp. 291-317 of Chapter 18 (Message Brokers—The Preferred EAI Engine).

Bussler, C. "The Role of B2B Engines in B2B Integration Architectures," Sigmod Record, [online], vol. 31, No. 1, Mar. 2002, XP002527699, Retrieved from Internet: URL: http://delivery.acm.org/10.1145/510000/507351/p67-bussier.pdf?key1=5073518&key2=2797122421&coll=GUIDE&dl=GUIDE, ACM &CFID=30759827&CFTOKEN=50460019.

Bussler, C. "P2P in B2BI" System Sciences, 2001, HICSS, Proceedings of the 35th Annual Hawaii International Conference on Jan. 7-10, 2011, Piscataway, NJ, USA, IEEE, Los Alamitos, CA, USA, Jan. 7, 2011, pp. 3947-3956 XP010587728 ISBN: 978-0-7695-1435-2.

Linthicum, D.S. "B2B Application Integration: E-Business-Enable Your Enterprise," B2B Application Integration: E-Busniess-Enable Your Enterprise, XX, XX, Aug. 1, 2001, pp. 261-276, ZP002253450.

Pusnik, M. et al. "Evaluation of Technologies for Business Process Automation" Informatica Solvene Soc. Informatika Slovenia [online] vol. 26, No. 4, Dec. 2002, pp. 373-380, XP002527700 ISSN: 0350-5596, Retrieved from the Internet URL:http:/ai.ijs.si/mezi/informatica/Informatica/Vol26/4_5_Pusnik.pdf.

Notice of Allowance dated Aug. 5, 2009, U.S. Appl. No. 10/435,629, filed May 9, 2003. 5 pgs.

* cited by examiner

DOCUMENT MESSAGE STATE MANAGEMENT ENGINE

BACKGROUND OF THE INVENTION

The present invention relates to the integration of business applications in an integrated business solutions computing environment. More specifically, the present invention relates to maintaining the order of messages and documents when processed or transformed by an enterprise server.

The current business environment is very different from what it was just a few years ago. Today's organizations embrace the global marketplace, and this dictates a need to be able to efficiently operate at all times. Customers are now more sophisticated which translates into an accelerated pace of business and decision-making processes. Further, business relationships have become highly dynamic, and customers expect businesses to adapt quickly.

Technical and operational challenges abound as well. There is a need to support multiple applications on a variety of platforms, and to integrate with companies using the Internet, extranets, business to business (B2B) exchanges, and other resources. Also, to effectively compete in today's market, there is a need to build new solutions on "Internet time," utilizing open Internet standards and technology to assure maximum interoperability.

Businesses have typically used a variety of mechanisms to control and analyze business operations such as accounting, payroll, human resources, employee tracking, customer relations tracking, etc. Tools which provide these functions are often implemented using computer software. For example, a software package may manage business accounting, another software package might be responsible for receiving new orders, yet another software package will track warehouse inventory and still another package may handle order fulfillment and shipment. In another example, a business software package operated by one business will need to exchange data with a software package operated by another business to allow a business-to-business transaction to occur.

When business tools are implemented in software, it is not unusual for proprietary software packages to be responsible for each individual business task. However, this implementation is cumbersome and requires the same data to be entered in differing formats among the various business applications. In order to improve efficiency, integration applications have been developed which are used to integrate various elements of one business application with elements of another business application.

For example, if a software package, which is used to obtain new orders, includes data fields (or "entities") referred to as CustomerNameLast and CustomerNameFirst, it is a relatively straightforward process to map those entries to an accounting software program having the data fields BillingAddressFirst and BillingAddressLast. In such an integration system, the relationship between entities in one system (i.e., computer system or application) and entities in another system can be stored in tables. A system administrator can configure entity mapping between the systems by selecting between the various entities of the two systems.

When an integration system actually executes the transaction between the source application and the destination application as defined by the mapping process, several steps occur. First the source application creates a document or message, which contains data stored as entities, and transmits or publishes that document or message to the integration application. The integration application transforms the document or message according to the transformation processes defined during the mapping. Then the integration application posts the transformed message to the destination application.

However, during the publishing and posting of documents and messages between the source and destination applications several problems often arise that affect the reliability of the system. One notable problem is that messages are published to the integration application in order, but are often processed through the server out of order. The integration application does not provide for the concept of ordered delivery of messages. For example, updates from an application are published in order, however, the integration application often seizes these updates as a batch of multiple messages and this results in the loss of ordering or priority of the messages. Thus, a newer update can process before an older update. This results in the posting in the destination application of out-of-date information.

Another problem that has been observed in integration applications used in a B2B environment is that messages often fail to post successfully, because other information necessary to the successful posting of the message has not been created in the destination system. For example, when a customer places a sales order for a product, certain events must be created prior to the processing of the customer's order. If the customer has chosen a specific method of shipping, this method of shipping must exist in the receiving system for the order to successfully post. If this order is not present in the receiving system, the message will not be able to post, and thus fail. However, if the sales order could have been held and not submitted for posting until the shipping method had been created then the message would have posted successfully.

Another problem that occurs is that messages and documents are published from the source system in an order that makes sense for the source system, but the destination system needs the documents in a different order. This typically occurs when in the source system one entity is a parent entity for another entity, but in the destination system the same entity is a child entity. For example in one system the parent entity is a contact name and the child entity is the business name, whereas in another system the parent entity is the business name and the contact name is the child entity. To integrate documents between the two systems it is desirable to ensure that the parent entity for the destination system posts before the child entity attempts to post.

Therefore, it is desirable to have an integration application or system that takes into account the order in which documents and messages are published to the application, takes into account the relationship between various documents, and considers the relationship between the various entities in the documents and messages when posting the messages to the destination system.

SUMMARY OF THE INVENTION

The present invention includes a state management subsystem that assists in transmitting and processing documents and messages between two applications in a sequentially correct order through an integration server. The integration server includes both messaging services and orchestration services to map and transform the message between the two applications.

Messages are picked up by a receive function from a message queue and processed by a preprocessor. While the message is in the preprocessor, the state management subsystem analyzes the message, and determines when the message was published to the messaging queue, and what messages or entities must exist in the destination system or application. The state management subsystem enters the message into a state management table with a state of submitted. Once the preprocessing is finished the message is returned to the receive function.

The message is then passed from the receive function to the channels, and processed through channels in the integration server. The channels transform the message according to a predefined process. This process transforms the message from a format that is useable by the source system to a format that is useable by the destination system. Once the message is transformed it is delivered to a pipeline.

When the message is in the pipeline the state management subsystem checks the status of the message in a state management table, and verifies that all waiting parameters have been satisfied. If the waiting parameters are not satisfied the message is set to retry, and is resubmitted to the receive function or messaging queues. If the waiting parameters are satisfied the message is set to posting, and the message is allowed to post to the destination system. Following a successful posting of the message the state management system sets the state to posted, otherwise the state is set to failed.

Another feature of the present invention is the set state procedure. This procedure defines the rules for changing the state of the message. The set state procedure checks various conditions stored in the tables of the state management subsystem, such as waiting conditions, ordering conditions, and message states. By checking these states and changing the state of the message only when necessary, the set state procedure ensures that messages are delivered to the destination system in the sequentially correct order. The set state procedure also allows the system to recognize and manage multiple messages going to the same destination system while maintaining the order necessary to reduce the number of messages that fail to post because of improper ordering of the messages.

DETAILED DESCRIPTION OF ILLUSTRATIVE EMBODIMENTS

The present invention deals with managing messaging systems. However, prior to discussing the invention in greater detail, one embodiment of an environment in which the invention can be used will be discussed.

Figure 1:
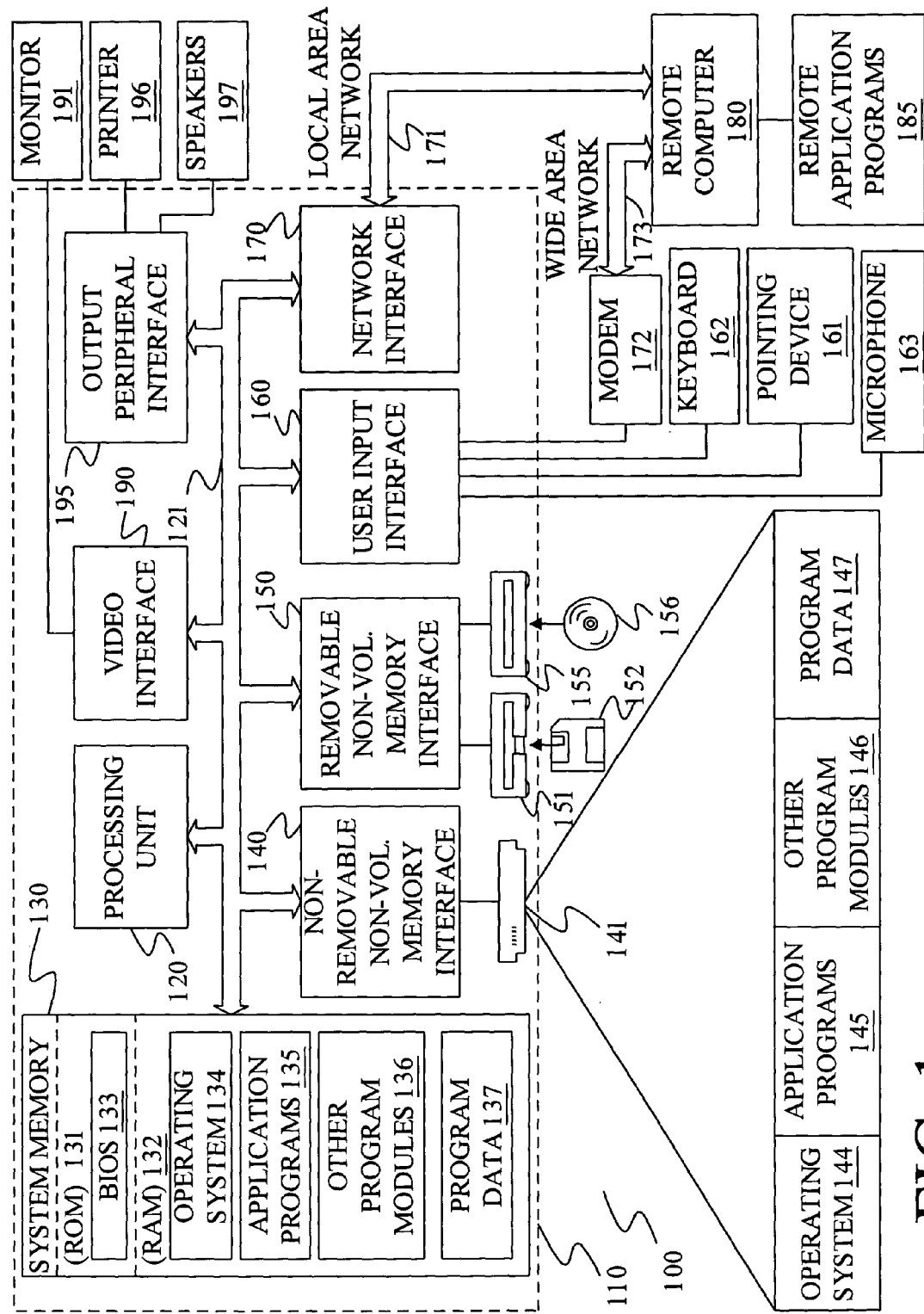
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
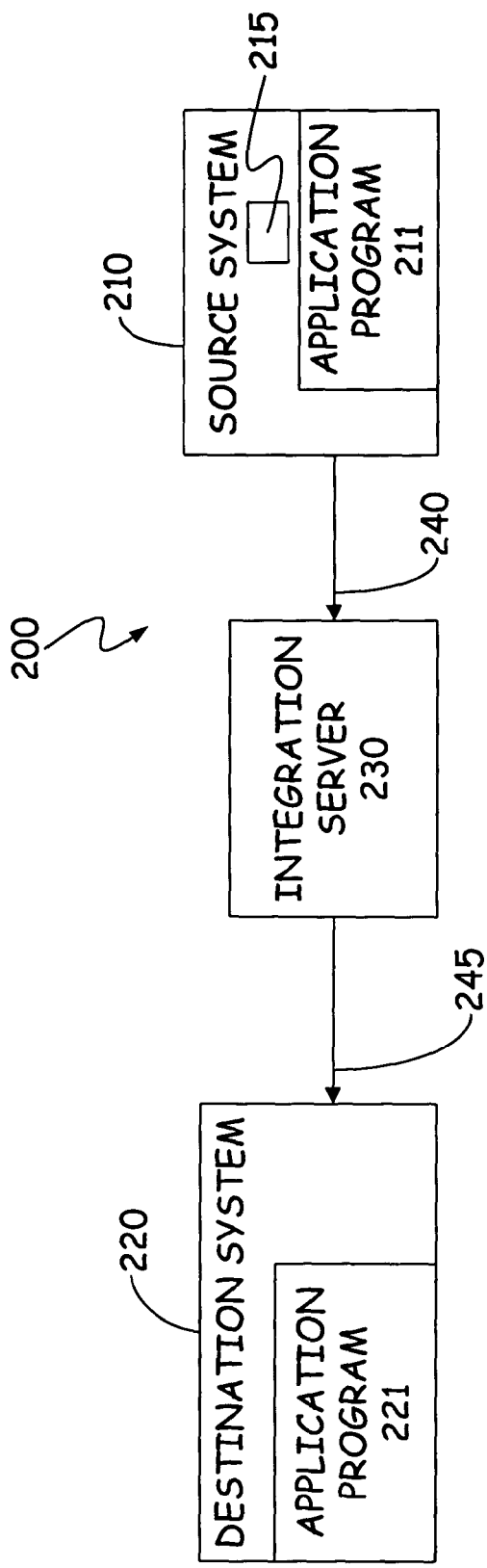
FIG. 2 is a block diagram illustrating an exemplary network environment in which the present invention can be implemented.

FIG. 2 is a block diagram illustrating a network environment in which the present invention can be implemented. Network 200 includes a source system 210, a destination system 220, an integration server 230, and document transports 240 and 245. Source system 210 is, in one embodiment, a computer, such as computer 110 or another system having an application program 211 that produces documents or messages 215. System 210 can be remote from or local to integration server 230. Similarly, system 220 can be a computer having an application program 221 that can receive documents or messages 215. Documents and messages are transported to and from integration server 230 via transports 240 and 245. Transports 240 and 245 can include hypertext transfer protocol (HTTP), secure hypertext transfer protocol (HTTPS), simple mail transport protocol (SMTP), Microsoft Message Queue (MSMQ) or other known transport protocols. Of course, the transports can be bidirectional but are simply shown in a context in which system 210 is the source and system 220 is the destination, by way of example.

Application program 211 produces a document or message 215, such as a sales order which is needed by application program 221. Messages are illustratively documents that have additional information attached to them, such as headers or footers which produce information regarding the information contained in the document. However, because application program 211 and application program 221 reside on different computers, and may use different formats or structures for data in a document, the document 215 must be transformed or altered so that application program 221 can read and understand the incoming document.

Integration server 230 provides this functionality by converting or transforming the format of the document 215 from application program 211 to the format of application program 221. Integration server 230 can be a computer (such as computer 110 in FIG. 1), a network server or any other information processing system. It should be noted that while only one integration server 230 is illustrated, systems 210 and 220 can be connected through multiple servers 230. Further, messages 215 can be passed through multiple servers 230 to reach the destination system 220.

Figure 3:
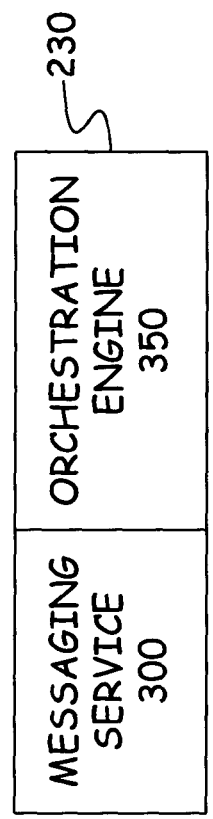
FIG. 3 is a block diagram illustrating two components of the integration server illustrated in FIG. 2.

FIG. 3 is a high level illustration of two components of the integration server 230 of FIG. 2. In one embodiment integration sever 230 is the BIZTALK Server from Microsoft Corporation of Redmond Wash. However, the integration sever 230 can be any other business to business (B2B) server or B2B integration control component or any component for messaging between two systems. The integration server 230 includes two separate individual server components, a messaging service 300 and an orchestration engine 350. However, other components can be included in server 230.

The orchestration engine 350 is, in one embodiment a COM+ application that manages complex distributed processes that require multiple decisions, loops and actions, such as, for example, processing an insurance policy application. The orchestration engine 350 is a simplistic graphical means of expressing a business workflow to assist in instructing the integration server 230 in learning how to transfer a document 215 from the format of application program 211 to the format of application program 221. The orchestration engine 350 assists a developer in creating workflow diagrams, or orchestration schedules, through the use of an orchestration designer to visually define and build the business process necessary to convert the formats.

Figure 4:
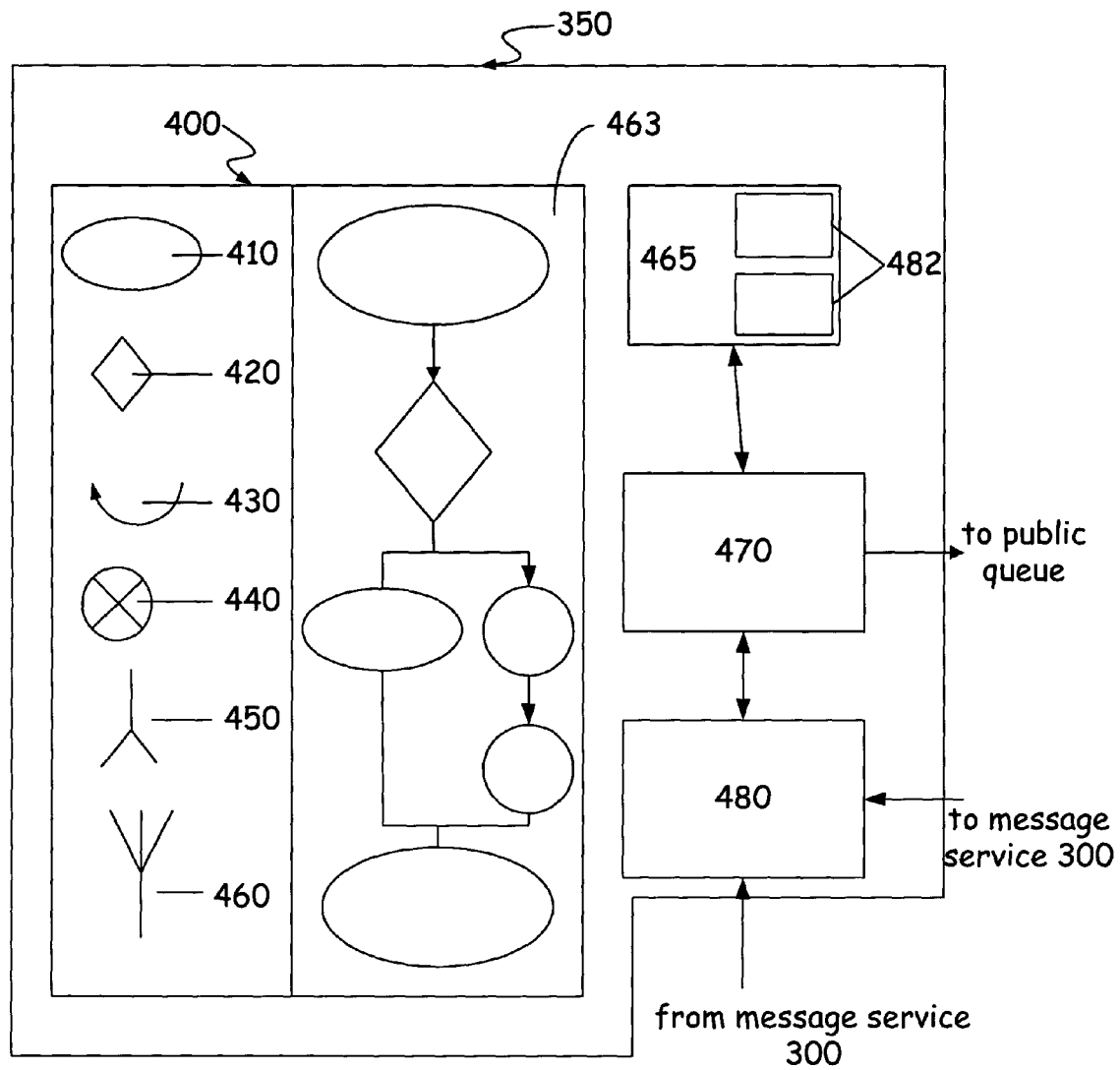
FIG. 4 is a block diagram illustrating the components of the orchestration engine illustrated in FIG. 3.

FIG. 4 is a block diagram illustrating the components of the orchestration engine 350. The orchestration designer 400 is a tool that facilitates the modeling process. One illustrative embodiment leverages existing graphical design software (such as VISIO 2000 also by Microsoft Corporation or any other graphical design component) to provide a graphical user interface (GUI) to assist the developer in developing a process model for the transformation. The process flow is graphically displayed to the developer as a flow chart 463. The orchestration designer 400 includes process options such as action 410, decision 420, while 430, abort 440, fork 450 and join 460. However, additional or different process options can be included in orchestration designer 400. Each of these process options allows for a different flow routine to be executed. For purposes of clarity and completeness a brief description of some illustrative examples of these process options is provided below for the sake of discussion.

The action process option 410 defines a process that typically requires information to be manipulated. For example, it might be an action step that runs the information through a filter, or it might be an action step that reformats data being processed.

The decision process option 420 defines a process where a yes/no, data query, or other information analysis is conducted, and the result determines which branch to follow to continue with the workflow. It may be determined that if a field is blank to have a branch that enables an action to fill the field with data. However, if the field is not blank, then a branch would allow the process to continue.

The while object process option 430 allows a process to loop until a specific event occurs. This might be a process that continues until the end of a dataset is reached, or it might be a process that continues until a specific data record is reached, for example. A branch can then be followed to a subsequent decision or action.

The abort object process option 440 identifies a step where the process needs to be terminated. In many cases, the abort 440 becomes a fail-safe test that determines that the information received is malformed, signaling data corruption in the transmission or just that incorrect data was transmitted. This step can provide a way to stop a process from continuing with incorrect information The fork process option 450 splits a process to conduct simultaneous tasks that can then be joined later through the join process option 460. This can, for example, be a process that enables information to be gathered for decisions to be made. For example, a fork in a process can be created to gather price and availability information from multiple vendors. This information can be gathered and processed simultaneously. From this fork, when the information has been analyzed, the system can join back together to continue with the process.

These process options are then linked to each other to generate a flow chart 463 or flow process for the desired process. The flow chart 463 is then compiled into a drawing 465. This "drawing" is referred to as an XLANG scheduling drawing 465. The XLANG scheduling drawing 465 is a version of flow chart 463 compiled into XLANG. XLANG is an XML based workflow definition language and is but one example of a definition language that can drive the orchestration engine 350.

Once the flow chart 463 has been converted into XLANG (or other definition language) it is passed to the XLANG scheduler engine 470. The XLANG scheduler engine 470 controls the activation, execution, dehydration, and rehydration of an XLANG schedule 465. This process takes the final designed business and technical process and puts it into a format that can be executed by the integration server 230.

The XLANG schedule 465 defines the steps to be performed, the components that must be called, and the data that will pass through the integration server 230 in order to complete the process generated by the orchestration designer 350. When documents or messages 215 are sent from the XLANG schedule 465 to the messaging service 300, the name of a channel that will receive the documents is defined. After the channel is defined, documents can pass from the messaging service 300 to an orchestration service 480 through the channel.

In the orchestration service 480, the document 215 is either processed in XML format for instance, or if the document is not in XML, the XLANG scheduler engine 470 can embed the document 215 in the engine's 470 standard XML wrapper. However, other internal language formats can be used. When inside the XLANG scheduler 470, the document 215 can undergo any modifications defined by the process. After processing the document 215, it can then be sent back to messaging service 300 for posting to a destination, or it can be sent out of the XLANG scheduler 470 to a private or public queue.

The XLANG scheduler engine 470 employs two processes to prevent scaling problems caused by multiple XLANG schedules running in parallel over extended periods of time. These two processes are referred to as dehydration and rehydration. Dehydration involves taking a schedule 465 that is not immediately required and writing the status of the schedule to a status database. As the schedule 465 is not being processed at that time, more resources are freed. Rehydration involves reloading the schedule 465 into the main memory of the server with the same status the schedule 465 had at the time of dehydration.

The orchestration service 480 includes ports 482, which are named locations in the XLANG schedule 465. The port 482 implements a technology, such as COM, MSMQ, or the messaging service, in order to send or receive messages. However, other technologies can be implemented as well. The port 482 can implement communications either synchronously or asynchronously, and is used to send messages or documents 215 to, or receive messages from the XLANG schedule 465. Orchestration ports 482 differ from messaging ports used in the messaging service 300. Messaging ports will be described in greater detail in FIG. 5.

Figure 5:
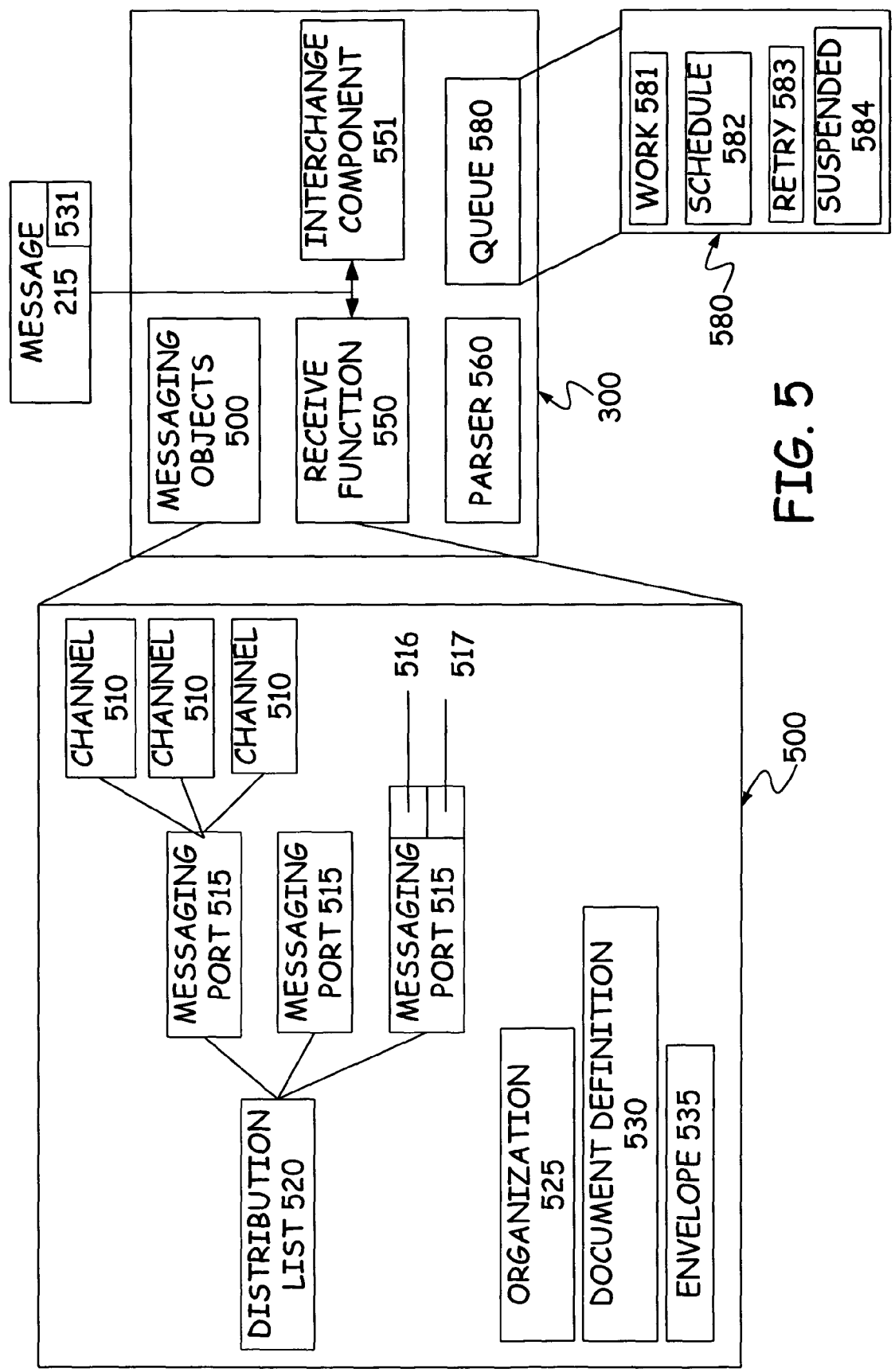
FIG. 5 is a block diagram illustrating the components of the messaging service illustrated in FIG. 3.

FIG. 5 is a block diagram illustrating the components of messaging service 300 in FIG. 3. Messaging service 300 includes messaging objects 500, receive functions 550, and parsers 560. However, other components can be included in the messaging service 300 such as interchange component 551 and queue 580. Messaging services 300 are a component in the integration server 230 that enable the sending, receiving, parsing, and tracking of messages and documents 215 from outside organizations or from applications, such as application programs 211 and 221 in FIG. 2. In addition, messaging services 300 include the ability to generate receipts for certain file formats, correlate and map data, verify the integrity of documents, and provide secure methods for exchanging documents with outside sources and applications.

Messaging objects 500, receive functions 550, component object models (COM) and COM+ methods, parsers 560, and SQL server databases (such as, for example, Microsoft SQL Server version 7.0 with SP2), can be used to implement the messaging services 300. Messaging objects 500 are used to configure the necessary properties to process and transmit documents submitted to the integration server 230. Receive functions 550, and in some instances other methods, are used to submit incoming documents or messages 215 to the integration server 230 for processing. Once a document or messages 215 is submitted, the appropriate parser 560 parses the document and, if necessary, converts the document to another format (such as an XML format). Finally a tracking database 561 stores document records for both incoming and outgoing documents 215 that are processed by the integration server 230.

Messaging objects 500 include channels 510, messaging ports 515, distribution lists 520, organizations 525, document definitions 530, and envelopes 535. However, other components can also be included. The integration server 230 uses these objects 500 to configure the necessary properties to process and transmit submitted documents 215 or messages. For purposes of this discussion the terms documents and messages are used interchangeably for data that is submitted to the integration server 230 for processing. The primary difference between documents and messages is that messages contain additional information such as headers and footers that are not present in documents.

Channel 510 is a named entity that is used as a reception gateway for documents and messages from either a previously known originating organization or from an open messaging source. An open messaging source is a generic channel that is configured to identify the origin of the message from the content of the message. In one embodiment, channel 510 is bound to a single messaging port 515. Whereas, a messaging port 515 can have an unlimited number of channels 510 assigned to it.

A channel 510 includes a set of properties, which identifies the source organization or application that has sent out the document or message. The channel 510 also defines the specific steps that are performed by the integration server 230 before the document is delivered to the associated messaging port 515. The channel properties can include a source organization or application, a document definition, a transformation map, field and document tracking settings, and archiving information. Only properly formatted and verifiable data is sent through channel 510. In order to ensure this, the channel 510 defines the format in which it expects to receive messages, and also defines how this data will be forwarded through to the associated messaging port 515. Both the inbound and outbound document definitions are references to document specifications that are expressed in a format that is understandable by the integration server 230. When a document 215 is submitted to the channel 510, it is verified against the inbound specification. If the document is not compatible with the required format for the channel 510, the data is rejected and the message is placed in a suspended queue. The queues 580 will be discussed in greater detail below.

When a document 215 is in the channel 510 the document 215 can illustratively be altered in two ways by transformation or translation. The document 215 is altered such that the definition of the document, and the data between records and fields for the source document specification, and the records and fields for destination document specification are correlated. This process of correlating information from one input format to another goes through one of two different processes. The integration server 230 can alter the schema of the information in a process that is said to transform the information (or be a transformation), or the integration server 230 can actually alter the data itself in a process that is said to be a translation of the information.

In one embodiment, the transformation process used by the integration server 230 is handled by script coding using functoids. A functoid is a reusable function built-in to the orchestration service engine 480 that enables simple as well as complex structural manipulation between source and destination specifications. A transformation of information is common because input and output formats frequently do not match, and need to be altered so that fields from one format match the fields of the other format during the transformation process. The translation process, although by definition alters the data in the document 215, does not necessarily delete the information and replace it with completely different data, but instead the information may be analyzed and modified for a new or different format. For example, data translation can replace a "State" definition such as "Calif" with a standard two-letter "CA" postal format. This transformation of the documents occurs in the channel 510 as the document 215 is passed through the messaging service 300.

Messaging ports 515 are a set of properties that specify how a message or document 215 is transported to a destination organization or application. Messaging port properties can include transport services, destination organization or application, security settings, and envelope settings.

Each messaging port 515 has a primary transport 516 and an optional backup transport 517. These transports 516 and 517 are used for binding communications endpoints that link to a remote organization or to an application. The messaging ports 515 provide a map between an abstract addressing scheme of organization identifiers and transport dependent addresses through channels 510. Hence, a multitude of messaging ports 515 can exist for a single destination organization or application.

The primary and back-up transports 516 and 517 are push services that use transport protocols supported by integration server 230 to deliver documents or messages 215 to the destination application. These transport protocols can include hypertext transfer protocol (HTTP), secure hypertext transfer protocol (HTTPS), simple mail transport protocol (SMTP), Microsoft Message Queue (MSMQ) or other transport protocols. Further, special transport protocols can be used such as Application Integration Components (AIC), which allow documents and messages 215 to be submitted directly, or to be carried over proprietary protocols.

When a document 215 is sent to the destination application 221 identified by the messaging port 515, the integration server 230 uses the primary transport 516. The back-up transport 517 is used only when there is a transport level error, such as an unreachable or crashed server when multiple servers are used. Therefore, the primary and back-up transports 516 and 517 generally use the same application protocols, but point to different channels 515 to increase robustness of the system.

Distribution lists 520 are a group of messaging ports 515. Distribution lists 520 are used to send the same document 215 to more than one organization or application. The distribution list 520 is sometimes referred to as a port group.

Organizations 525 are trading partners or other entities with whom the integration server 230 exchanges messages and documents. These organizations can be internal to the server, such as an application or division within the host organization, or can be external to the server, such as an external business or an application at that external business.

Document definitions 530 are a set of properties that represents an inbound or an outbound document 215. The document definition 530 can include a property that provides a pointer to a document specification. A document specification 531 defines the document structure, document type, and version. However, a pointer from the document definition 530 to the document specification 531 is not required.

One or more documents 215 can be packaged together as an interchange, which is submitted to the integration server 230. The interchange can be a single document along with header and footer information. However, the interchange can also involve multiple documents having header and footer information. As headers and footers are used in the interchange, the messaging service 300 needs to be able to identify where in the interchange the document begins and ends. Depending on the file format the messaging service 300 will need to know how the header and footer information is structured, and hence where the document 215 is found in the interchange. The messaging service 300 receives this information through the use of envelopes 535.

Envelopes 535 are a set of properties that represent the transport information for a document. The envelope 535 wraps data for transport and selects the destination of the data. Envelopes 535 include headers for messages and function groups. However, other types of headers can be included in the envelope 535. In one embodiment, the messaging service 300 uses six types of envelopes 535. These are X12, EDI-FACT, Flat-File, Custom, Reliable, and CustomXML. However, other or additional types of envelopes can be used. The type of envelope 535 used to wrap the document 215 tells the messaging service 300 which parser 560 should be used to process the incoming document. An envelope 535 associated with an inbound message or document provides the integration server 230 with the information that the server needs to interpret the submitted document. For example, the envelope 535 can include a pointer to a document definition 530. Envelopes 535 associated with an outbound message or document give an outside server the information it needs to create the document.

Inbound messages do not necessarily require an envelope 535 to accompany the document 215. Envelopes 535 are required only for documents that are submitted to the messaging service 300 that are in a format that the messaging service 300 cannot able to readily recognize. However, for outbound documents messages an envelope 535 may be required. The envelope 535 is created during the configuration of the outbound messaging port 515. This allows the messaging service 300, through a serializer, to build a complete outgoing message including the header and footer information, so that when the document 215 is submitted to another messaging service it is able to identify the type of documents being submitted, regardless of the internal format used by the destination server.

Message and documents are submitted into the integration server 230 through an interchange component 551 or a receive function 550. The interchange component 551 is configured to support transactions. As a result, the interchange component 551 adopts the characteristics of the application that is invoking the interchange component 551. Once a message or document is submitted, the interchange component 551 selects the appropriate parser 560 in integration server 230 based on information in the envelope 535 to parse the message or document, unless the message or document is submitted with a pass-through flag enabled. The parser 560 converts the document 215 contained in the message from its native format to a format that is understandable by the messaging service of the server. In one example, if the integration server 230 is configured to operate in an XML format, the parser does not parse documents that are submitted in XML. The integration server 230 also does not parse messages and documents submitted with the pass-through flag enabled, but passes the document on to the destination in the format it was submitted.

Receive functions 550 are components of the integration server 230 that monitor either a message queue 580 or a directory in a file system directory. When a message arrives in the queue 580 or a file is placed in the directory, the receive function 550 takes the file or message and submits it directly for processing by the messaging service 300. File receive functions watch a certain directory identified on the logical drive or on a universal naming convention (UNC) file path. The file receive function continuously monitors the identified directory for files that have specified file extensions, and when files having these extensions arrive, the file receive function submits the associated document for processing. Message queue receive functions monitor queues in the shared queue database 580 and submits arriving items into the queue for processing.

When a message or document 215 is submitted to the integration server 230, the document or message 215 is stored in a shared queue database 580 until it is picked up for processing. The shared queue 580 includes four separate queues, a work queue 581, a scheduled queue 582, a retry queue 583, and a suspended queue 584. By accessing these queues 580, it is possible to determine what stage of processing a message or document 215 is in. For example, it is possible to determine if a document has been processed and is waiting for transmission or if the message or document failed processing. Messages and documents 215 appear in each of the queues in the order of "first in, first out." That is, the oldest items in the work, retry, scheduled, or suspended queue appear first and the newest items appear last.

The work queue 581 holds all messages and documents that have been submitted to the integration server 230 for asynchronous processing, but have not been picked up by the receive function 550. If messaging processing is synchronous, the work queue 581 is not used and the document is processed immediately. The work queue 581 contains messages and documents 215 that are currently waiting to process. Messages and documents placed in the work queue 581 are processed upon arrival, and therefore do not remain in the work queue for long periods of time.

The receive function 550 polls the work queue 581 at predetermined time intervals to pickup the next documents in the work queue 581 for processing. These documents are picked up by the receive function 550 as batches of documents or messages. The rate of release of documents in the work queue 581 depends on the configuration of the integration server 230. Any message in the work queue 581 can be moved to the suspended queue 584. Once a message or document is moved to the suspended queue 584, it can be deleted, resubmitted, or retransmitted to the work queue 581 to complete processing at a later time.

When a message or document is processed, a channel 510 and a message port 515 are associated with the message. The message port definitions can include a service window for processing the message. For example, the service window could be defined as between Midnight and 1:00 am. If the message is processed outside this service window the message is redirected to the scheduled queue 582. The scheduled queue 582 contains messages and documents that have been processed by the integration server 230 and are waiting for transmission based on the service window. The scheduled queue 582 holds the message until the service window opens. Once the service window is opened the message service 300 attempts to resend the message through the previously identified message port 515. Like the work queue 581, any item in the scheduled queue 582 can be moved to the suspended queue 584.

If a message fails to send or post due to a communications error or for other reasons the message is placed in the retry queue 583. The retry queue 583 contains messages and documents 215 that are to be resubmitted for delivery and documents that are waiting for reliable messaging receipts. A message can be sent to the retry queue 583 if during processing a receipt was expected, but was not present. When a receipt is required, a message can remain in the retry queue 583 until the receipt is received, or it can be treated like all other messages in the retry queue 583 and automatically resent. The message will continue to be resent according to the frequency and number of attempts configured by the channel 510. If the number of attempts to resend the message exceeds a threshold or the document's time to live (TTL) is exceeded, the message 215 is moved to the suspended queue 584.

The suspended queue 584 stores and displays messages and documents 215 that have failed processing, or that have failed to post to their destination. Messages can fail because some fatal unrecoverable error occurred in processing. For example, these errors can include parsing errors, serialization errors, and missing channels. Messages in the suspended queue 584 have an associated error report that indicates why the message was placed in the suspended queue 584. Depending on the nature of the failure most messages or documents in the suspended queue 584 can be deleted, resubmitted, or retransmitted to the server 230 for processing. However, in one embodiment, some messages and documents cannot be resubmitted, for example, messages that failed parsing cannot be resubmitted or retransmitted.

The integration server 230 takes documents 215 from the queues 580 in batches for processing and transformation through the receive function 550. However, once documents are taken from the queues 580 in batches, any order that may have existed in the documents is lost. It is only by chance that documents and messages 215 are processed in the correct order. To help ensure that documents 215 are posted in the correct order, the integration server 230 also includes a document messaging state management engine that assists in posting a document from a first application program 211 to a second application program 221 in an order that is sequentially correct for the second application program 221. The document messaging state management engine is illustratively a component module of the messaging service 300.

Ordered delivery or sequential delivery of documents is important in at least three general areas of document publishing. First is an instance message, second is a parent/child message, and third are associated messages. Instance messages are messages that are related to an entity instance (i.e. address update for a customer). Child messages are messages that are dependent upon a specific related message or parent (i.e. a customer entity is the parent entity for the customer's address or phone number). Associated messages or associated entity instances are messages that are dependent upon the posting of another unrelated message (i.e. customer A wants shipping method B, which is unrelated to customer A).

Figure 6A:
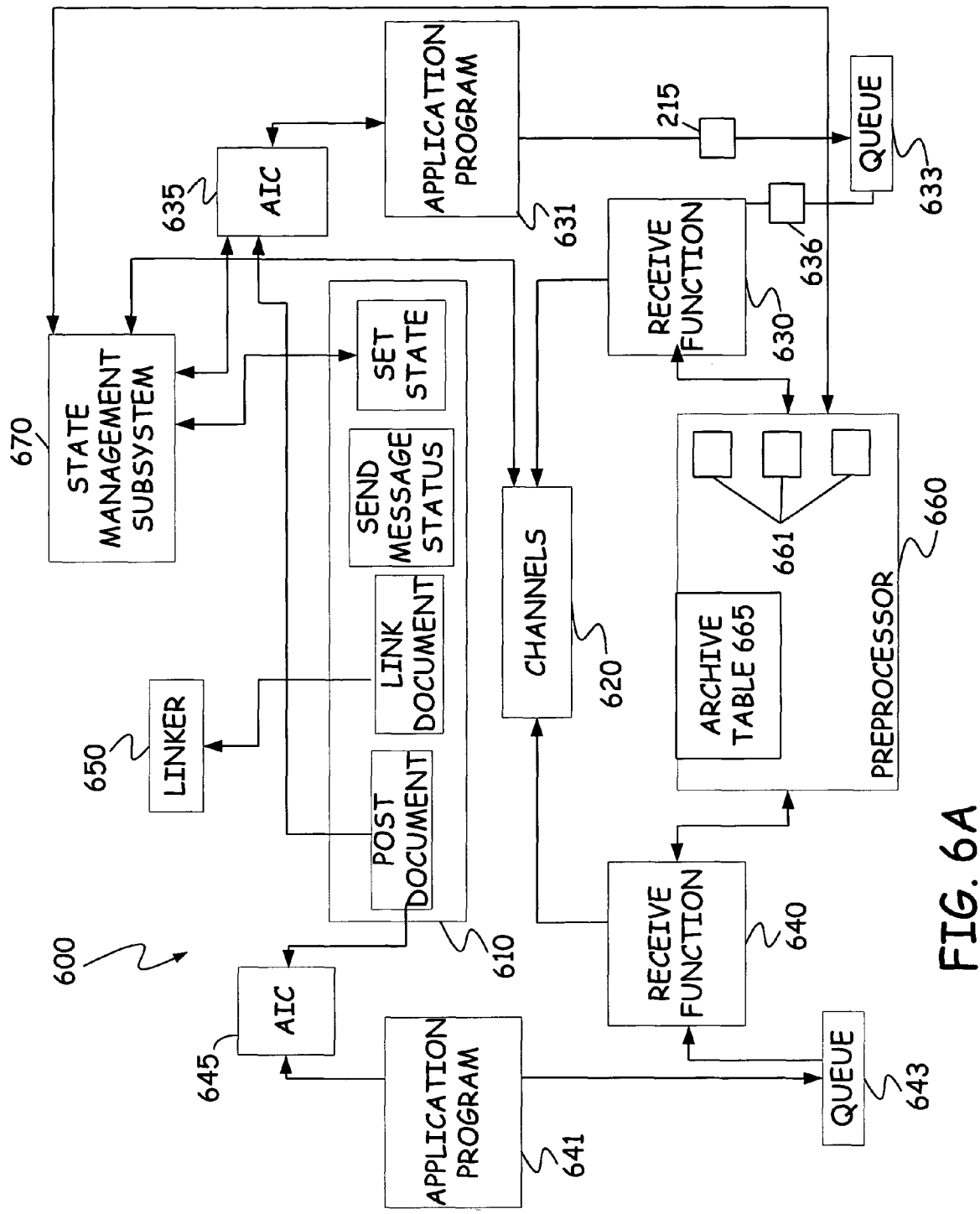
FIGS. 6A and 6B show a block diagram illustrating a messaging service including a state management subsystem.
Figure 6B:
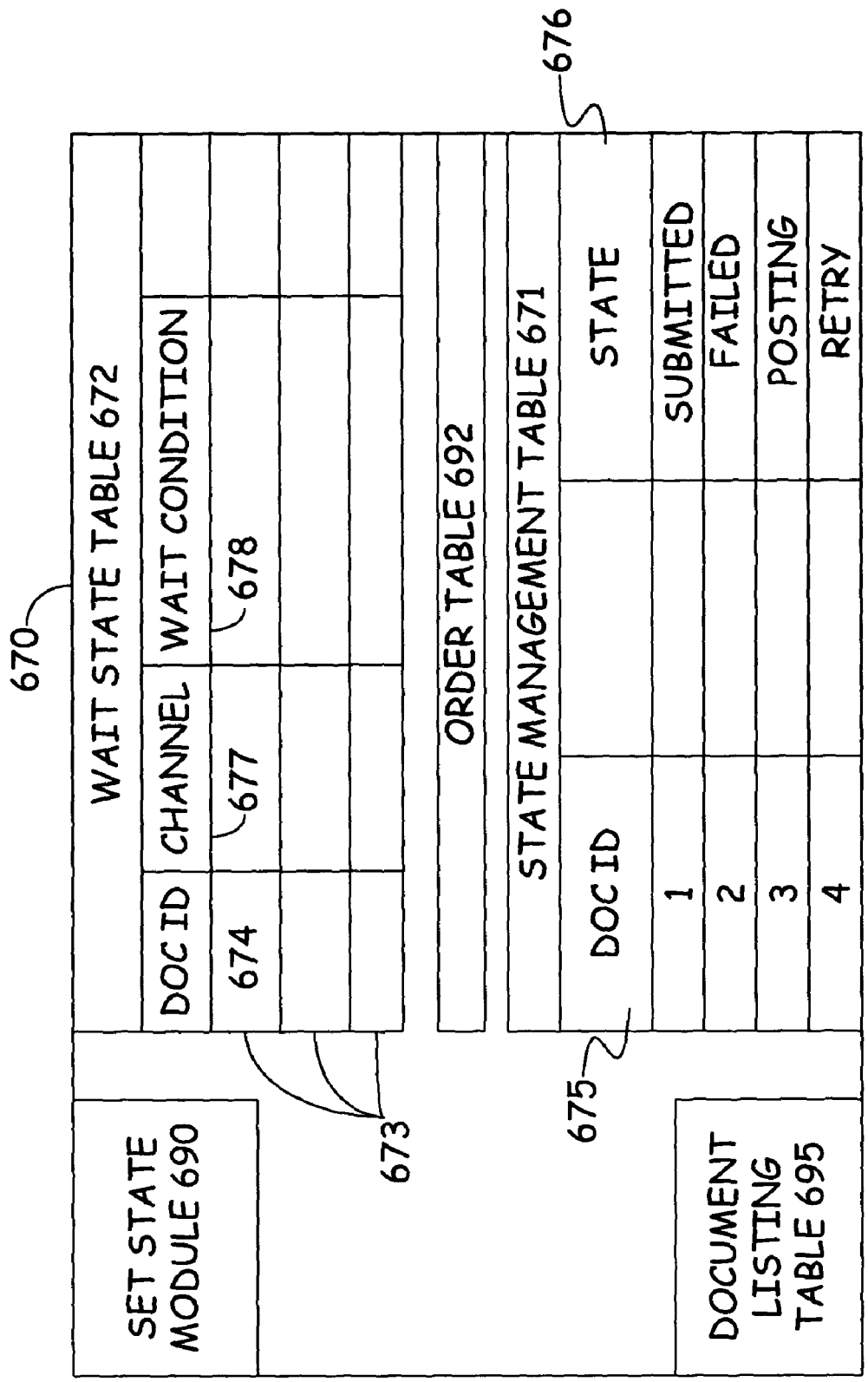

FIGS. 6A and 6B illustrate a messaging service 600 having the state management system of the present invention. Messaging service 600 includes a pipeline 610, channels 620, a first application receive function 630, a second application receive function 640, a first application or source application integration component (AIC) 635, a second or destination AIC 645, a first application queue 633, a second application queue 643, a linker 650, a preprocessor 660, and a state management subsystem 670. State management subsystem is illustrated in greater detail in FIG. 6B. The messaging service 600 is connected to a first application program 631 and a second application program 641.

When a document 215 is published as a message to the messaging service 600 it contains information indicating when the document was published from the first application program 631 prior to it entering the messaging service 600. This information can be either explicit information, such as a sequential ordinal indicating the document's order, or it can be implicit information, such as a timestamp in the message's header.

Figure 7:
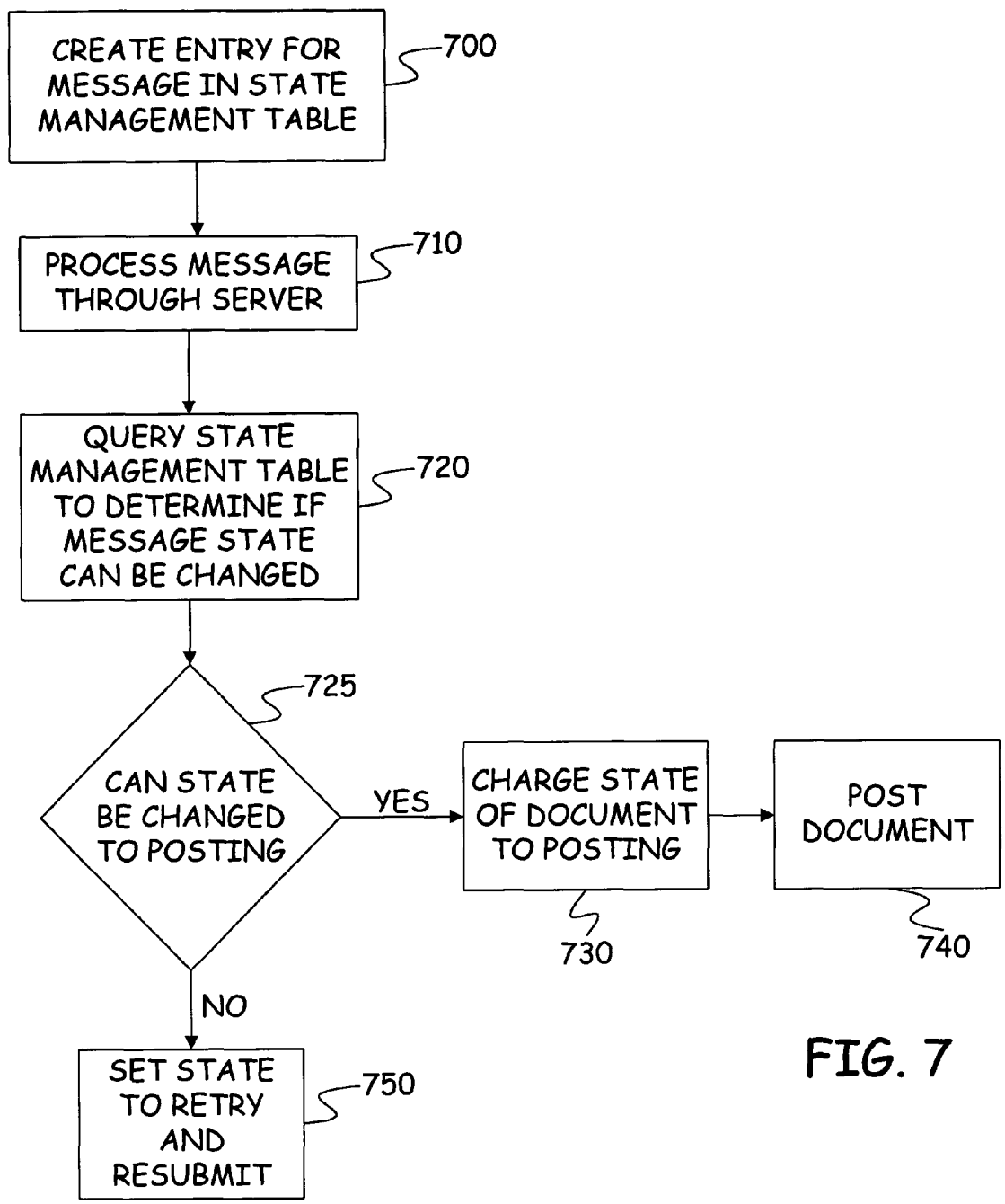
FIG. 7 is a flow diagram illustrating the steps that are executed by the state management subsystem when a document is published by the messaging service.

FIG. 7 is a block flow diagram illustrating the basic steps that are executed by the state management subsystem 670 when a document is published to the messaging service 600. FIGS. 6A, 6B and 7 will be described together and reference is made to each drawing.

First, the state management subsystem 670 creates an entry in a state management table 671 in the system 670 for the document 215 that indicates that the document has been submitted, its order, and its associated state in a wait state table 672. This is indicated at block 700. Following completion of this process the document 215 is allowed to proceed through the messaging service 600 as though the state management system 670 was not present. This is illustrated at block 710. When the documents has completed any required transformation through the channels 610, the document is examined by the subsystem 670, which queries the state management table 671 to identify the current state of the document in order to determine if the document's state can be changed by using a set state procedure of the set state module 690 (which will be discussed in greater detail below). This is illustrated at blocks 720 and 725.

If the document's state can be changed, then its state will be changed, and the document will be posted to the second application program. These steps are illustrated at blocks 730 and 740, respectively. The steps executed to change the state will be discussed in greater detail in FIG. 9. If the document cannot be changed for various reasons, the document is placed in a retry state, and resubmitted to the service at a latter time. This is illustrated at block 750.

Referring back to FIGS. 6A and 6B, documents in the state management table 671 are placed in one of eight states. These states include submitted, retry, retriable, ignored, posting, posted, failed, and failed special. However, depending on the specific system requirements other or additional states can be used. Each state represents a specific condition of the associated document 215. Illustratively, the system attempts to move all documents 215 to the state of posting. Posting is the state where the state management system 670 allows the document 215 to try and post to the second application program 641. The state of the document 215 is changed by invoking the set state module 690. Once a document has successfully posted its state is changed from posting to posted by the system 670. If the document is not able to be posted it is set to the state of failed.

In some configurations during the transformation of the document in the channel 620, a look-up call can be executed to check to see if a specific entity in the destination application exists. During this look-up call it may be discovered that another event must occur prior to the current message. If this is discovered then the state of the document is set to the state of retriable by the system 670. When the document 215 finishes the transformation process in the channel 620, the state management system 670 changes the state from retriable to retry, so that the document 215 can be resubmitted for posting later. As the messaging service 600 resubmits all documents that are currently in the retry state, the state management subsystem 670 sets the state initially to retriable to prevent the service 600 from submitting the current document twice.

The ignored state is invoked when a large number of messages are posted to the messaging service 600, and these messages cannot be processed right away. For example, a sales order can generate a large number of messages that cannot be processed until another action is taken, such as receiving a confirmation that the order is complete. The state management subsystem 670 places the current messages requiring this further action in the ignored state. The ignored state indicates to the service 600 that the message was submitted, but wont allow the service 600 to pick up the message until the required action has occurred and the state is changed.

Documents placed in the retry state are retried until they are successful. However, it is desirable to stop the processing of documents which have been retried for an extended period of time. Therefore, documents have a time to live (TTL), after which the document is no longer processed and its state is set to fail. However, because nothing went wrong with the processing of the document other than the document timed out, the document's 215 state is set to the state of failed special, which is a special fail state. This special fail state is provided so that it is possible to later review the reason for the failure and possibly resubmit the document.

As discussed above, ordered delivery of documents from the source application program 631 to the destination application program 641 is important. If the document 215 processes through the channel 620, and the state management subsystem 670 determines that the document will be posted out of order, its state is changed to retry. This order information can be contained in order table 692, which the state management subsystem 670 can be configured to query to determine ordering information. This ordering information can be entered into table 693 by the preprocessor 660 during preprocessing. Documents and messages can also be set to retry for numerous other reasons such as waiting on an earlier instance of the same document to post, waiting for the parent document to post before posting the child document, or waiting for an associated entity instance to post.

Messages that are changed from submitted to retry can be resubmitted to the service 600 in either the original published form, or in the transformed form. However, to ensure that the most current information is used in the documents when they are posted, documents are illustratively resubmitted for transformation in the original published form to account for any updates that may have occurred in the interim to any associated fields.

Documents and messages 215 are submitted to the receive function 630 when they are placed in one of the messaging services queues 633. Once the receive function 630 picks up the document 215 as part of a batch 636 of documents picked up from the queue 633, the document 215 is provided to the preprocessor 660.

The preprocessor 660 includes several interfaces 661 that define the structure of the document. Some of these features include header and footer information. Each application program 631, 641 that submits messages or documents to the messaging service has its own interface. The preprocessor 660 selects the correct interface 661 based upon the application program that generated the document or message. This interface is then loaded into the preprocessor 660. The interface 661 determines the primary key and the entity type for the current document or message. However, different configurations can require other information from the interface 661.

Once the interface 661 is selected, the message 215 is loaded into the preprocessor 660, and the preprocessor 660 calls the state management subsystem 670 and sets the message's state to submitted in column 676, and enters its document ID 674 in column 675 of the state management table 671. The preprocessor 660 also passes a copy of the message to an archive table 665. The preprocessor 660 then checks the type of message that has been submitted. If the message 215 is of a type where it is necessary to wait for a parent document or record (e.g. an address where it is known that the parent customer must exist) the preprocessor 660 writes an entry 673 into a wait state table 672 for the message. This entry 673 indicates that the state management system 670 will wait for the parent document or message to be created before allowing the child message to post. This entry includes a document ID 674, an entry for the channel the message will take 677, and information regarding the waiting conditioned in column 678. Depending on the performance of the system 670, a check can be made of the destination application 641 to see if the parent already exists, but this check is not necessary. The preprocessor 660 is configured to identify from the message the required entities that must exist prior to posting the message. This information is then written to the wait state table 672 as part of entry 673. The entry 673 defines the waiting parameters 678 for the message.

The wait state table 672 can include a variety of waiting parameters 678. For example, a message 215 can be entered into the wait state table 672 if it is dependent upon an event happening, such as a customer waiting for a specific type of shipping. In this example the shipping type entities must be created before the customer's order can be posted.

Messages can be placed into the wait state table 672, and not released for posting based on a publication order. For example, a message with a timestamp of 3 cannot be posted until messages having timestamps 1 and 2 have posted. In determining the order in which a series of messages should be published, the preprocessor 660 first checks for any explicit ordering information, such as priority information or incremental ordinals contained in the message 215. If an explicit ordering is not present, the preprocessor 660 will order the messages based upon the timestamp for when the message 215 was first published to the messaging service 600. This order information can also be stored in an order table 692. Finally messages can be placed in the wait state table 672, and not allowed to post based upon a user defined set of parameters.

The wait state table 672 also contains information as to which channel in the channels 620 the message is to be submitted for transformation. As a message 215 can be submitted through multiple channels 620, each associated channel 620 has its own individual wait state entry 673 in the table 672. This multiple entry for the same message 215 is used because different channels may have different orders and may receive information differently.

Once the preprocessor 660 has written the message to the wait state table 672, the message is returned to the receive function 630. The receive function 630 then passes the document to one of the channels 620. In the channel 620 the transformation procedure developed in the orchestration service of FIG. 3 and the XLANG schedule can be used to convert the message from the source application's 631 format to the destination application's 641 format. During this transformation process a check for external links can be performed, if an external link is required to exist. If the link is not required to exist then this check is not performed. If a link is required to exist, and the required link does not exist, the state management system 670 invokes the set state procedure of module 690 to change the state of the message to retriable. However, no change is made to the associated entry 673 in the wait state table 672.

The state management sub-system 670 also includes a table 695 which lists all of the messages 215 that are currently in the system, all of the channels 620 that are in use, and the state of all of messages 215 in the system.

Figure 8:
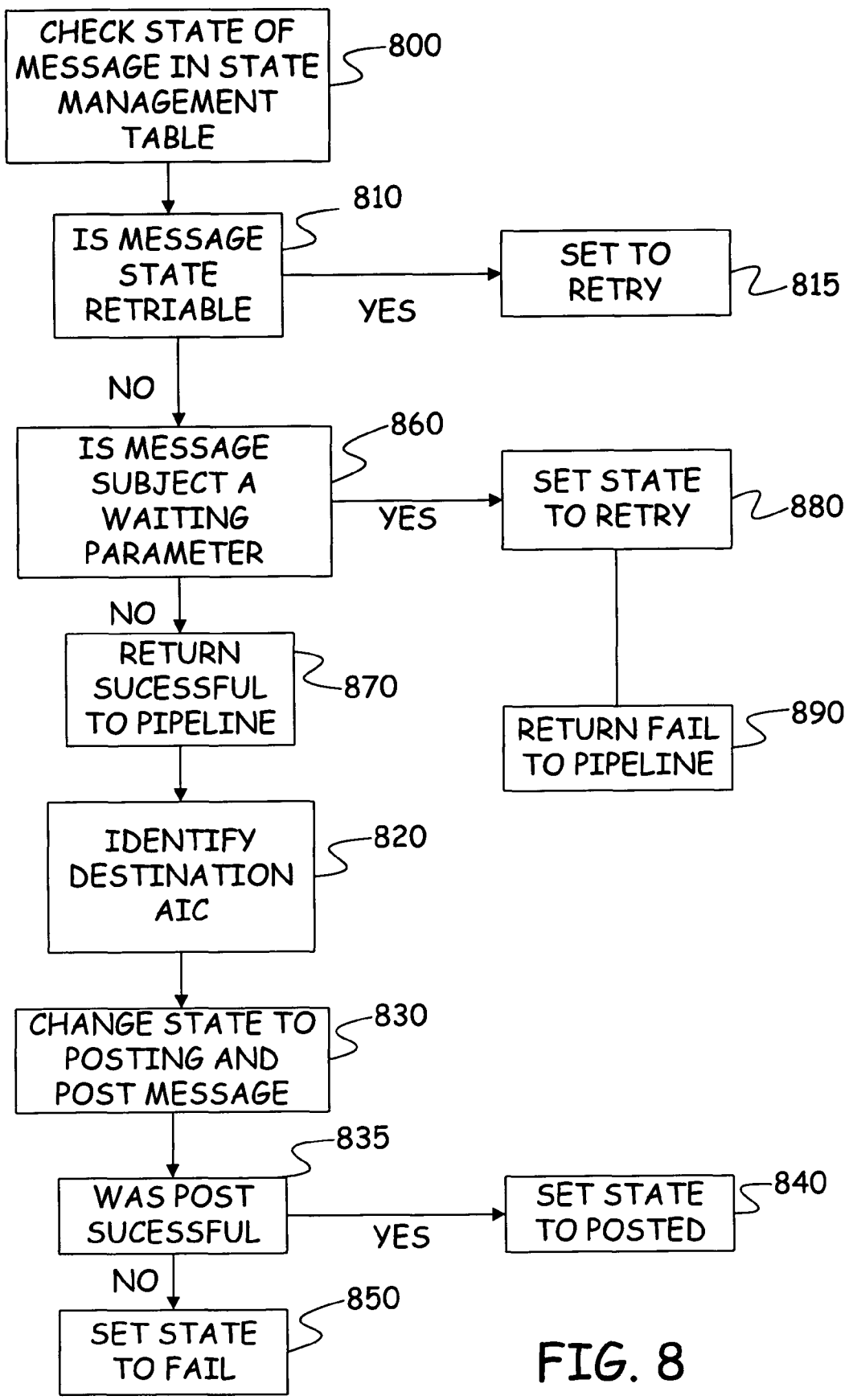
FIG. 8 is a flow chart illustrating the steps executed by the state management system when a document reaches the pipeline.

After the channel 620 processes the message 215 it is passed to the pipeline 610. The pipeline 610 is an interface that receives an indication that the transformation and posting of a document was successful. The state management system 670 executes several functions when the document reaches the pipeline 610. This process is illustrated by the flow chart of FIG. 8.

At step 800 the state management subsystem 670 checks in the state management table 671 for the state of the document or message 215. At 810 state management subsystem 670 checks to determine whether the message state is in the state of retriable. If the message is in the state of retriable, state management subsystem 670 invokes the set state procedure to change the message to the state of retry. This is illustrated at step 815.

If the state was not in the state of retry the state management subsystem 670 refers back to the wait state table 672 to determine what conditions or waiting parameters 678 are required to be completed before the message can be changed to the state of posting. This is illustrated at step 860.

While the message is in the pipeline 610, state management subsystem 670 can also check to determine whether any external links that are required exist. This is performed by checking a table generated by linker 650. The process of creating this table does not form part of the present invention. One embodiment is described in more detail in application Ser. No. 10/435,629 filed May 9, 2003. If the external links are present, the document's state is changed to posting, otherwise the state is changed to retry.

If the waiting condition and/or external links are in proper form, a successful key is returned to the pipeline 610. This is illustrated at step 870. If the conditions are not met, the system management subsystem 670 changes the state of the document from submitted to retry so that the document can be picked up and resubmitted by the messaging service. This is illustrated at step 880. At 890, the state management subsystem 670 returns to the pipeline an indication that the document cannot be posted. This indication stops the pipeline 610 from attempting to post the document to the destination application program.

If the message is in a state other than retry, the state management subsystem 670 returns to the pipeline 610 an indication that it may proceed to post the document to the destination program 641. The pipeline can submit the document to the destination application 641 through its AIC 645, by using data contained in the message which identifies the AIC 645. This is illustrated at block 820. At this point the set state procedure in module 696 is called and the state is changed from submitted or retry to posting. This is illustrated at step 830.

Next, the subsystem 670 determines whether the post was successful, at step 835. If the message or document posted successfully, then the state management subsystem 670, through the set state procedure, changes the status of the document to posted, at step 840. If the message failed to post, then the state management subsystem 670 changes the state to failed at step 850. Once a document or message is placed in the state of posted or failed, no further processing or handling of the document is done by the system 600.

Resubmitted documents and messages are submitted directly to the associated channels without having to go through the preprocessor 660 again. The original information for the document contained in the wait state table 672 also remains unchanged for the document.

In one embodiment, the state of a document or message can only be changed by one state at a time. Further, the states can only be changed in certain orders. For example, a document cannot go directly from a state of submitted to a state of posted. To ensure that the rules of state change are properly followed, a set state module 690 having a set state procedure is called by the state management subsystem 670 when a state change is required.

Figure 9:
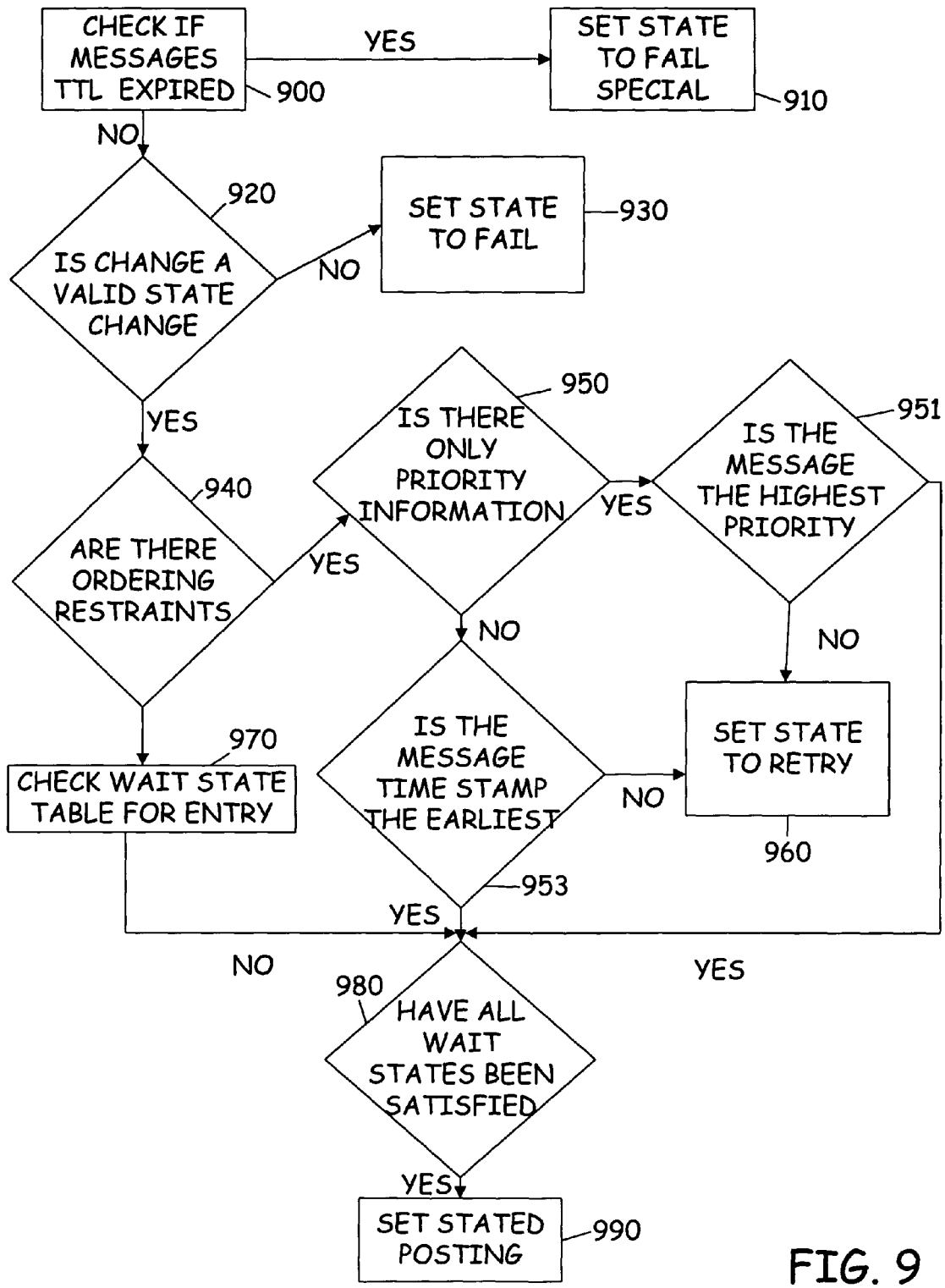
FIG. 9 is a flow chart illustrating the steps executed by the set state procedure to change the state.

FIG. 9 is a flow chart illustrating the steps executed by the set state procedure when a change in state is desired. At 900, the procedure checks to see if the documents time to live (TTL) has expired. If the TTL has expired the set state procedure sets the state to fail special at 910. If the TTL has not expired the set state procedure checks to see if the state change desired is a valid change at 920. If the requested change is not valid the state is set to fail at 930. At 940, the procedure checks to see if there are any ordering restraints present on the message. If there are ordering restraints present the system checks to see if there is any priority information at 950. If priority information is present documents or messages will be processed in order of their priority for the same entitykey/channel, otherwise they will be processed in timestamp order with the oldest processed first. If priority information is present the procedure at 951, checks to see if the message has the highest priority. The procedure continues to the wait state check at block 970. If another document must be processed first, the set state procedure changes the state to retry at 960. If there is no priority information present, the procedure, at 953, checks the timestamp for the message. If the message is not the oldest it is set to retry, at block 960. If the message is the oldest then the procedure continues to the wait state check at block 970.

Once the priority check is complete, the set state procedure, at 970, checks to see if a wait state entry 673 exists for the document in the wait state table 672. If an entry 673 exists in the wait state table 672, the set state procedure checks to see if that condition has been met at step 980. If the condition of the wait state is met then the procedure changes the state to posting at 690. If the condition is not met the procedure sets the state to retry at 695.

In summary, the present invention is directed to a state management sub-system that assists in transmitting and processing documents and messages between two applications or systems in a functionally correct order through an integration server. To achieve this result, messages are picked up from a receive function and processed by a preprocessor. The preprocessor makes a copy of the message and stores the message in an archive table. While the message is in the preprocessor, a state management subsystem analyzes the message and determines when the message was published to the receive function, what messages or entities must exist in the destination system, and enters the document into a state management table with a state of submitted. Once the preprocessing is finished the message is returned to the receive function.

The message is then passed from the receive function to the channels, and processed through channels in the integration server. While in the channels the message is transformed according to a predefined process. This process transforms the message from a format that is useable by the source system to a format that is useable by the destination system. Also while the message is in the channel, a look-up function can examine the message for any external links that may need to exist before the message can successfully post to the destination system. Following transforming the message through the channel, the message is delivered to a pipeline. When the message is in the pipeline the state management subsystem checks the status of the message in the state management table, and verifies that all waiting parameters have been satisfied. If the waiting parameters have not been satisfied the message is set to retry and is resubmitted to the receive function. If the parameters have been satisfied the state of the message is set to posting and the message is allowed to post to the destination system. If the post was successful the state management system sets the state to posted, otherwise the state is set to failed. Most of the processing and control of the ordering by the state management subsystem occurs while the message is in the pipeline.

Another feature of the present invention is the set state procedure. This procedure defines the rules for changing the state of the message. The set state procedure checks the various conditions stored in the tables of the state management subsystem, such as waiting conditions, ordering conditions, and message states. By checking these states and changing the state of the message only when necessary, the set state procedure ensures that messages are delivered to the destination system in the functionally correct order. The set state procedure allows the system to recognize and manage multiple messages going to the same destination system while maintaining the order necessary to reduce the number of messages that fail to post because of improper ordering of the messages.

Although the present invention has been described with reference to particular embodiments, workers skilled in the art will recognize that changes may be made in form and detail without departing from the spirit and scope of the invention.

What is claimed is:

1. A method, implemented at least in part by a computing device, for controlling posting of messages from a source system to a destination system through an integration control component, the method comprising:
receiving at a receive function of the integration control component a message from the source system;
accessing a state management table that includes an identifier for the message and a status of the message and selecting the message status for the message from submitted, failed, posting, retry, and retriable;
identifying a waiting parameter for the message in a preprocessor, wherein the waiting parameter comprises at least one of a prerequisite data field or a prerequisite message at the destination system;
processing the message through the integration control component from the source system to the destination system in a sequential order with respect to one or more other message, using the computing device, wherein processing comprising:
determining whether the waiting parameter associated with the message has been satisfied;
analyzing a portion of the message to identify whether an external link between the integration control component and an external application is required to exist prior to posting the message, wherein the external link relates to a messaging transport that links the integration control component and the external application; and
if the external link is required to exist:
in response to determining the external link does not exist, changing the status of the message identified by said message identifier in the state management table to retriable;
in response to determining that the waiting parameter has been satisfied, posting the message identified by said message identifier to the destination system.

2. The method of claim 1 further comprising:
providing a copy of the message to the preprocessor; and
wherein identifying comprises identifying the waiting parameters in the preprocessor.

3. The method of claim 1 wherein processing the message comprises:
transforming the message from a first form adapted for use by the source system to a second form adapted for use by the destination system.

4. The method of claim 1 wherein identifying any waiting parameters comprises:
writing the identified waiting parameters as an entry for the message in a wait state table in a state management subsystem.

5. A method, implemented at least in part by a computing device, for controlling posting of messages from a source system to a destination system through an integration control component, the method comprising:
receiving at a receive function of the integration control component a message from the source system;
identifying whether any waiting parameters exist for the message in a preprocessor, comprising:
a parent/child relationship between the message at the integration control component and a prerequisite data field or a prerequisite message at the destination system;
a related data field existing in or a related message posting to the destination system prior to the message; and
an unrelated data field existing in or an unrelated message posting to the destination system prior to the message;
processing the message through the integration control component from the source system to the destination system in a sequential order with respect to one or more other messages, using the computing device, wherein processing comprises:
analyzing a portion of the message to identify whether an external link between the integration control component and
external application is required to exist prior to posting the message, wherein the external link relates to a messaging transport that links the integration control component and the external application;

determining whether the waiting parameter and any identified external links associated with the message have been satisfied; and in response to determining that the waiting parameter has been satisfied and if the external link is required to exist, that the external link exists:

accessing a state management table that includes an identifier for the message and a status of the message;

changing the status of the message identified by said message identifier in the state management table to posting; and posting the message identified by said message identifier to the destination system.

6. The method of claim 5 further including:

writing the message order waiting parameter to a message order table.

7. The method of claim 5, wherein processing the message comprises:

transforming the message from a first form adapted for use by the source system to a second form adapted for use by the destination system.

8. The method of claim 5, wherein identifying any waiting parameters comprises:

writing the identified waiting parameters as an entry for the message in a wait state table in a state management subsystem.

9. A method, implemented at least in part by a computing device, for controlling posting of messages from a source system to a destination system: the method comprising:

receiving a message from the source system;

determining a message status for the message by accessing a state management table that includes an identifier for tile message and the status of the message;

selecting the message status for the message from submitted, failed, posting, retry, and retriable;

identifying any waiting parameters for the message comprising at least one of a prerequisite data field or a prerequisite message at the destination system;

analyzing the message using the computing device to identify an external link between the integration control component and an external application that is required to exist prior to posting the message to the destination system, wherein the external link relates to a messaging transport that links the integration control component and the external application; and determining whether the waiting parameters has been satisfied and whether the external link exists; and in response to determining that the external link does not exist:

changing the status of the message identified by said message identifier to indicate it is retriable;

in response to determining that the external link does exist:

changing the status of the message identified by said message identifier to indicate it is posting; and posting the message identified by said message identifier to the destination system.

10. The method of claim 9 further comprising:

providing a copy of the message to a preprocessor; and analyzing the message in the preprocessor.

11. The method of claim 9 further comprising:

transforming the message from a first form adapted for use by the source system to a second form adapted for use by the destination system.

12. The method of claim 9 further comprising:

writing identified waiting parameters as an entry for the message in a wait state table in a state management subsystem.

13. The method of claim 9 further comprising checking for a parent/child relationship between two or more messages.

14. The method of claim 9 further comprising checking for a related data field existing or posting prior to the message.

15. The method of claim 9 further comprising checking for an unrelated data field existing or posting prior to the message.

16. The method of claim 9 further comprising checking a message order based upon an order in which a plurality of messages were received from the source system.

17. The method of claim 16 further comprising writing the message order waiting parameter to a message order table.

18. The method of claim 1, wherein identifying the waiting parameter comprises identifying any waiting parameters comprising:

a parent/child relationship between the message at the integration control component and the prerequisite data field or prerequisite message at the destination system;

a related data field existing in or posting to the destination system prior to the message; and unrelated data field existing in or posting to the destination system prior to the message.

\* \* \* \* \*